United States Patent
Giri et al.

(10) Patent No.: US 10,521,212 B2
(45) Date of Patent: *Dec. 31, 2019

(54) ALERTING THE PRESENCE OF BUNDLED SOFTWARE DURING AN INSTALLATION

(71) Applicant: McAfee, LLC, Santa Clara, CA (US)

(72) Inventors: Babu Nath Giri, Bangalore (IN); Prashanth P. Ramagopal, Bangalore (IN); Vinoo Thomas, Tamil Nadu (IN)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,711

(22) Filed: Mar. 11, 2019

(65) Prior Publication Data
US 2019/0272163 A1 Sep. 5, 2019

Related U.S. Application Data

(63) Continuation of application No. 16/101,159, filed on Aug. 10, 2018, now Pat. No. 10,255,053, which is a
(Continued)

(51) Int. Cl.
*G06F 9/445* (2018.01)
*G06F 8/61* (2018.01)
(Continued)

(52) U.S. Cl.
CPC .............. *G06F 8/61* (2013.01); *G06F 3/0482* (2013.01); *G06F 3/04842* (2013.01);
(Continued)

(58) Field of Classification Search
CPC ..................................................... G06F 9/445
See application file for complete search history.

(56) References Cited

U.S. PATENT DOCUMENTS

| 5,931,909 A | 8/1999 | Taylor |
| 6,023,763 A | 2/2000 | Grumstrup et al. |

(Continued)

FOREIGN PATENT DOCUMENTS

CN 104050409 9/2014

OTHER PUBLICATIONS

United States Patent and Trademark Office, "Non-Final Office Action," dated Nov. 3, 2016 in connection with U.S. Appl. No. 14/705,662, 19 pages.
(Continued)

*Primary Examiner* — Jae U Jeon
(74) *Attorney, Agent, or Firm* — Hanley, Flight & Zimmerman, LLC

(57) ABSTRACT

Methods, apparatus, systems, and articles of manufacture for alerting the presence of bundled software during an installation are disclosed. An example method includes identifying installation of a software product. The software product is scanned to identify first information, the first information to include information extracted from a file associated with the software product that is indicative of a main application to be installed as part of the software product. Information displayed to a user during the installation of the software product is scanned to identify second information. Whether a bundled application is included in the software product is identified based on the first information, the second information, and the signature file.

29 Claims, 9 Drawing Sheets

Related U.S. Application Data continuation of application No. 14/705,662, filed on May 6, 2015, now Pat. No. 10,089,095.

(51) Int. Cl.

| | | |
|---|---|---|
| *G06F 21/56* | (2013.01) | |
| *G06F 3/0484* | (2013.01) | |
| *H04L 29/06* | (2006.01) | |
| *G06F 21/51* | (2013.01) | |
| *G06F 3/0482* | (2013.01) | |
| *G06F 21/57* | (2013.01) | |
| *G06F 9/451* | (2018.01) | |
| *H04L 29/08* | (2006.01) | |

(52) U.S. Cl.
CPC ............ *G06F 21/51* (2013.01); *G06F 21/564* (2013.01); *G06F 21/57* (2013.01); *H04L 63/145* (2013.01); *H04L 63/1425* (2013.01); *G06F 9/453* (2018.02); *H04L 67/34* (2013.01)

(56) References Cited

U.S. PATENT DOCUMENTS

| | | | |
|---|---|---|---|
| 6,614,457 B1 | 9/2003 | Sanada et al. | |
| 6,789,215 B1* | 9/2004 | Rupp | G06F 8/61 714/38.14 |
| 7,739,682 B1 | 6/2010 | Badenell | |
| 8,312,262 B2 | 11/2012 | Mauro, II et al. | |
| 8,321,949 B1 | 11/2012 | Green et al. | |
| 8,744,852 B1* | 6/2014 | Seymour | G06F 3/0481 704/258 |
| 2003/0126472 A1 | 7/2003 | Banzhof | |
| 2003/0149670 A1 | 8/2003 | Cronce | |
| 2003/0156719 A1 | 8/2003 | Cronce | |
| 2003/0220883 A1* | 11/2003 | Block | G06F 21/10 705/59 |
| 2006/0095470 A1 | 5/2006 | Cochran et al. | |
| 2006/0136727 A1 | 6/2006 | Voss et al. | |
| 2007/0162975 A1 | 7/2007 | Overton et al. | |
| 2007/0198423 A1 | 8/2007 | Carbone et al. | |
| 2009/0241105 A1 | 9/2009 | Perrone et al. | |
| 2011/0047621 A1 | 2/2011 | Brando et al. | |
| 2011/0055823 A1 | 3/2011 | Nichols et al. | |
| 2012/0090025 A1 | 4/2012 | Milner et al. | |
| 2013/0067459 A1 | 3/2013 | Sannidhanam et al. | |
| 2013/0159719 A1 | 6/2013 | Ha et al. | |
| 2013/0198842 A1* | 8/2013 | Klein | G06F 21/562 726/23 |
| 2013/0275960 A1 | 10/2013 | Kirchev et al. | |
| 2014/0019474 A1 | 1/2014 | Yamagishi | |
| 2014/0096246 A1 | 4/2014 | Morrissey et al. | |
| 2014/0282488 A1 | 9/2014 | Tagliabue | |

OTHER PUBLICATIONS

United States Patent and Trademark Office, "Non-Final Office Action," dated Sep. 25, 2017 in connection with U.S. Appl. No. 14/705,662, 29 pages.

United States Patent and Trademark Office, "Notice of Allowance," dated May 11, 2015 in connection with U.S. Appl. No. 14/705,662, 21 pages.

United States Patent and Trademark Office, "Advisory Action," dated Jul. 20, 2017 in connection with U.S. Appl. No. 14/705,662, 4 pages.

United States Patent and Trademark Office, "Final Office Action," dated Jan. 25, 2018 in connection with U.S. Appl. No. 14/705,662, 7 pages.

United States Patent and Trademark Office, "Final Office Action," dated Apr. 28, 2017 in connection with U.S. Appl. No. 14/705,662, 21 pages.

European Patent Office, "Extended Search Report," issued in connection with European Patent Application No. 16789722.2, dated Nov. 27, 2018, 8 pages.

United States Patent and Trademark Office, "Notice of Allowance," issued in connection with U.S. Appl. No. 16/101,159, dated Nov. 21, 2018, 14 pages.

United States Patent and Trademark Office, "Notice of Allowability," issued in connection with U.S. Appl. No. 16/101,159, dated Feb. 6, 2019, 2 pages.

United States Patent and Trademark Office, "Advisory Action," issued in connection with U.S. Appl. No. 14/705,662, dated Jul. 20, 2017, 4 pages.

United States Patent and Trademark Office, "Final Office Action," issued in connection with U.S. Appl. No. 14/705,662, dated Apr. 28, 2017, 21 pages.

United States Patent and Trademark Office, "Final Office Action," issued in connection with U.S. Appl. No. 14/705,662, dated Jan. 25, 2018, 7 pages.

United States Patent and Trademark Office, "Non-Final Office Action," issued in connection with U.S. Appl. No. 14/705,662, dated Nov. 3, 2016, 19 pages.

United States Patent and Trademark Office, "Non-Final Office Action," issued in connection with U.S. Appl. No. 14/705,662, dated Sep. 25, 2017, 29 pages.

United States Patent and Trademark Office, "Notice of Allowance," issued in connection with U.S. Appl. No. 14/705,662, dated May 11, 2018, 17 pages.

* cited by examiner

ALERTING THE PRESENCE OF BUNDLED SOFTWARE DURING AN INSTALLATION

RELATED APPLICATION

This patent arises from a continuation of U.S. patent application Ser. No. 16/101,159, (now U.S. Pat. No. 10,255,053) which was filed on Aug. 10, 2018, and was entitled "ALERTING THE PRESENCE OF BUNDLED SOFTWARE DURING AN INSTALLATION," which was a continuation of U.S. patent application Ser. No. 14/705,662, (now U.S. Pat. No. 10,089,095) which was filed on May 6, 2015, and was entitled "ALERTING THE PRESENCE OF BUNDLED SOFTWARE DURING AN INSTALLATION. U.S. patent application Ser. Nos. 16/101,159 and 14/705,662 is hereby incorporated herein by reference in their entireties. Priority to U.S. patent application Ser. Nos. 16/101,159 and 14/705,662 is hereby claimed.

TECHNICAL FIELD

Embodiments described herein generally relate to client and server network traffic, and more particularly to systems and methods for alerting a user of the presence of bundled software during installation of a software product.

BACKGROUND ART

Desktop software or applications may often come with other potentially unwanted programs (PUP's). A PUP is unwanted and/or malicious software, which is distributed by discreetly bundling a requested software product that a user has requested with the unwanted software product that the user may have no knowledge of or interest in. Software agreements that refer to these additional bundled software may often be buried within an end user license agreement (EULA) that is obscured from a user or be hidden under advanced selection buttons as options in a graphical user interface (GUI) instance displayed during an installation process. A user who does not pay close attention to a EULA text or a selection button that indicates the presence of a PUP may unwittingly or without the user's knowledge install the PUP on the user's computer system. These PUPs can be malware such as, for example, adware or spyware that cause undesirable system behavior or alter the security state and privacy posture of the system on which they are installed. Further, spyware may also eavesdrop on a user's activities by collecting personal information like Internet surfing habits, user logins, and bank or credit account information, or may interfere with a user's control of the computer by installing additional harmful software or redirecting web browsers to unintended sites. Malware may also change a computer's settings, which can result in slow Internet connection speeds, unauthorized changes in browser settings, changes to software settings, or the like.

Current solutions to prevent these PUP's place the burden of preventing installation of these bundled PUP components on end users. For example, end users are expected to read a EULA text or watch carefully the GUI options that are provided during an installation in order to determine whether additional software is included and may be installed during the installation process. These users may have to deselect software components associated with PUPs if they were not requested by the user. However, non-security savvy or novice users usually choose a default installation option as a quicker or "painless" option, which can result in installation of these additional PUPs. Some anti-virus software solutions may warn a user that software is being installed on a system; however, these solutions do not provide a way to discriminate between an authorized installation of an intended application and an unwanted PUP family. Other software solutions detect adware or spyware; however, they only detect such adware or spyware after it is installed on a user's computer. A way of detecting the presence of a PUP bundled with user-intended software during installation and alerting the user of the PUP would be desirable.

DESCRIPTION OF EMBODIMENTS

Figure 1:
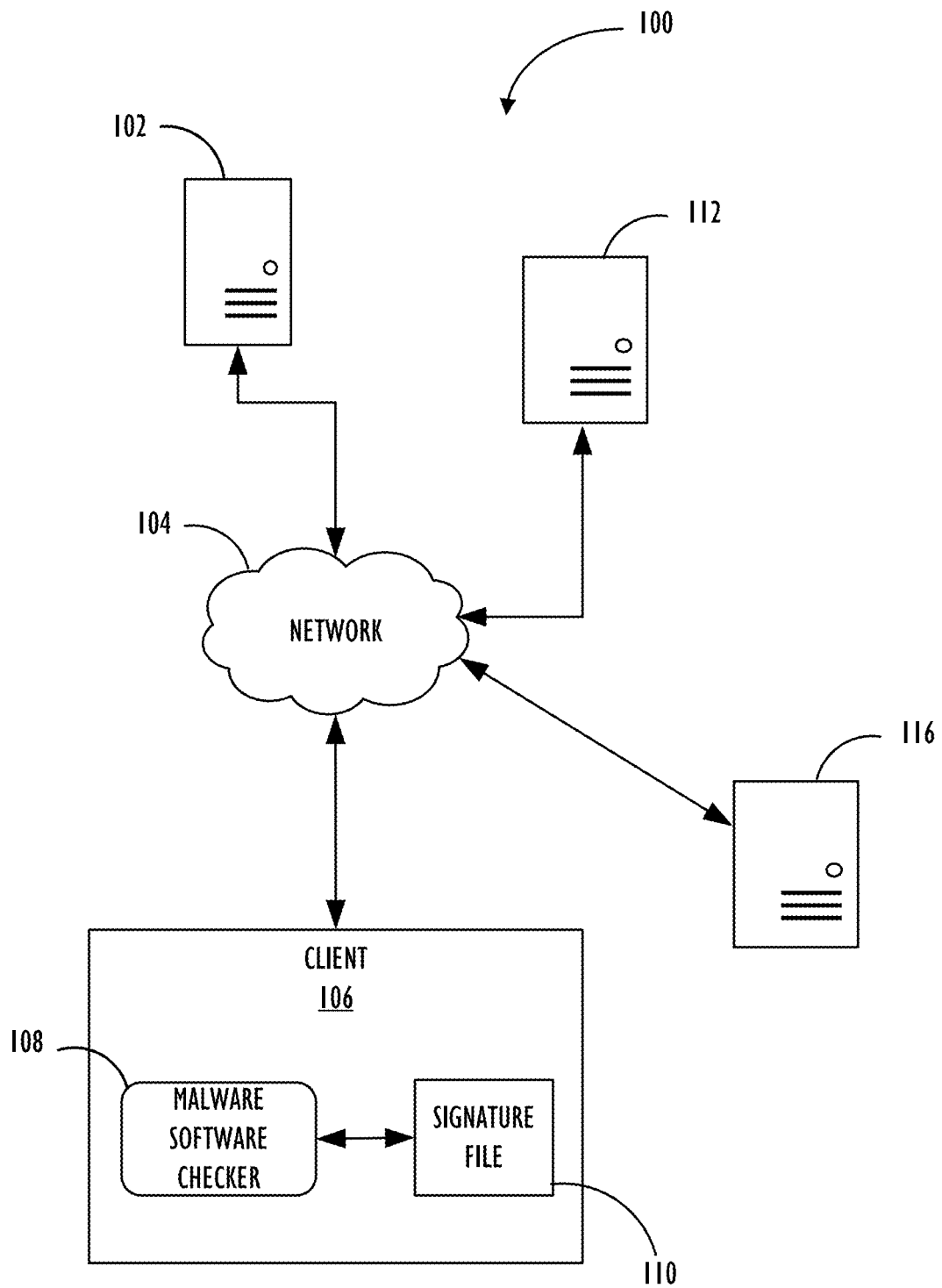
FIG. 1 is a diagram illustrating a system for detecting bundled software products during an installation of a software product according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "malware" can refer to any software used to disrupt operation of a programmable device, gather sensitive information or gain access to private systems or networks. Malware includes computer viruses (including worms, Trojan horses, etc.), Bots, ransomware, spyware, adware, tracking cookies, scareware and any other type of malicious programs.

A technique allows a client computing system with a user client to receive a user-intended software product in an installation package from a server. The user-intended software product may be bundled with a potentially unwanted program. The user client can include logic to determine if the user-intended software product includes other bundled software products by reading one or more software identifiers located in graphical user interface instances that are created during installation of the user-intended software product or other non-GUI files that are included in the installation package. In embodiments, graphical user interface instances are read to identify information that are related to software identifiers for the user-intended software product and software identifiers of potentially unwanted programs that are included in the installation package. The software identifiers may be used to determine whether potentially unwanted programs are bundled with the user intended software product. In an embodiment, a signature file may be received from a server and the software identifiers of the user-intended software product and the potentially unwanted programs can be checked against the signature file during installation of the user-intended software product in order to detect the presence of potentially unwanted programs that may be bundled with user-intended software product. Although software products may include license text and/or instances of graphical user interface that are provided during installation, users may not be able to discriminate that additional bundled software is included, which may be malware, for example, adware or tracking cookies that may potentially harm a user's compute from a mere reading of the text of a license or graphical user interface provided during installation. The technique allows all software installers including novice software installers to determine whether the bundled software products may be malware although bundled as necessary components of the user-intended software.

Referring to the figures, FIG. 1 illustrates a system 100 for performing a security check of a software product that may be received by a user client 106 in order to identify the software product a user intends to install, to detect the presence of bundled software in the software product, and to alert the user of the bundled software during installation of the software product (hereinafter "user-intended software product") according to one embodiment. System 100 may include a content server 102, network 104, user client machine 106 (or user client 106), third-party server 112, and reputation server 116. Content server 102 may be in communication with user client 106 over network 104 and be configured to communicate software applications, documents, or other content from server 102 to user client 106 in response to a request for software or applications made from user client 106 (i.e., the user-intended software products) via network 104. In one embodiment, a user may install the user-intended software products from a memory device connected to user client 106. In an embodiment, the software product that is received from server 102 may include additional software components or applications such as, for example, plug-ins, browser extensions, or software that may be transmitted to user client 106 along with the user-intended software products that may be received from server 102 via network 104. In an embodiment, these additional software components may be discreetly bundled with the user-intended software products that are downloaded to user client 106. Network 104 is not limited to a network of interconnected computer networks that use an internet protocol (TCP/IP), and can also include other high-speed data networks and/or telecommunications networks that are configured to pass information back and forth to user client 106. Also, while three servers 102, 112, and 116 are shown in the example of system 100, any number of servers are contemplated to be in communication with user client 106.

System 100 may also include a third-party server 112 that is in communication with user client 106 via network 104. Third-party server 112 is associated with a service provider and may be configured to generate a signature file 110 that may be distributed to user client 106 for use in identifying the user-intended software products that a user intends to install and for identifying additional bundled software that may be unwanted and not a necessary part of the installation package for user-intended software products. In an embodiment, third-party server 112 may be configured to gather information about software names and bundling of software including gathering information associated with blacklisted and whitelisted sites or domains in order to build signature file 110. In one embodiment, third-party server 112 may be configured to determine the presence of additional bundled software on behalf of user client 106 by receiving software identifiers from user client 106 that were extracted during installation of user-intended software products and comparing the software identifiers against a signature file in order to identify the presence of additional software components.

User client 106 may include a desktop computer, laptop computer, smart phone, tablet device, and any other types of computing devices having a processor and networking capabilities. User client 106 may include a malware software checker 108 and, optionally, signature file 110 that may be received from third-party server 112. Signature file 110 can include software names and bundled information as well as names of blacklisted and whitelisted software, sites, domains and other keywords. In one embodiment, malware checker 108 may be configured to scan the user-intended software products and flag each indicator of an instance of a software identifier (for example, a software name) during installation of the user-intended software products in order to determine whether additional bundled software products are being installed during installation of the user-intended software products from the software identifiers. Alternatively, or in addition to determining whether additional bundled software products are being installed from the software identifiers, malware checker 108 may utilize signature file 110 during the security check of the user-intended software products that are downloaded from server 102, for comparison against software identifiers in the user-intended software products that indicates the presence of bundled software. In an embodiment, user client 106 may communicate, with reputation server 116, information related to a match so that reputation server 116 can update statistical information on the user-intended software product and its bundled software. In another embodiment, user client 106 may communicate with reputation server 116 information related to software identifiers for which no known signature exists in signature file 110 upon which user client 106 may either terminate installation or allow installation of user-intended software products on user client 106.

Figure 2A:
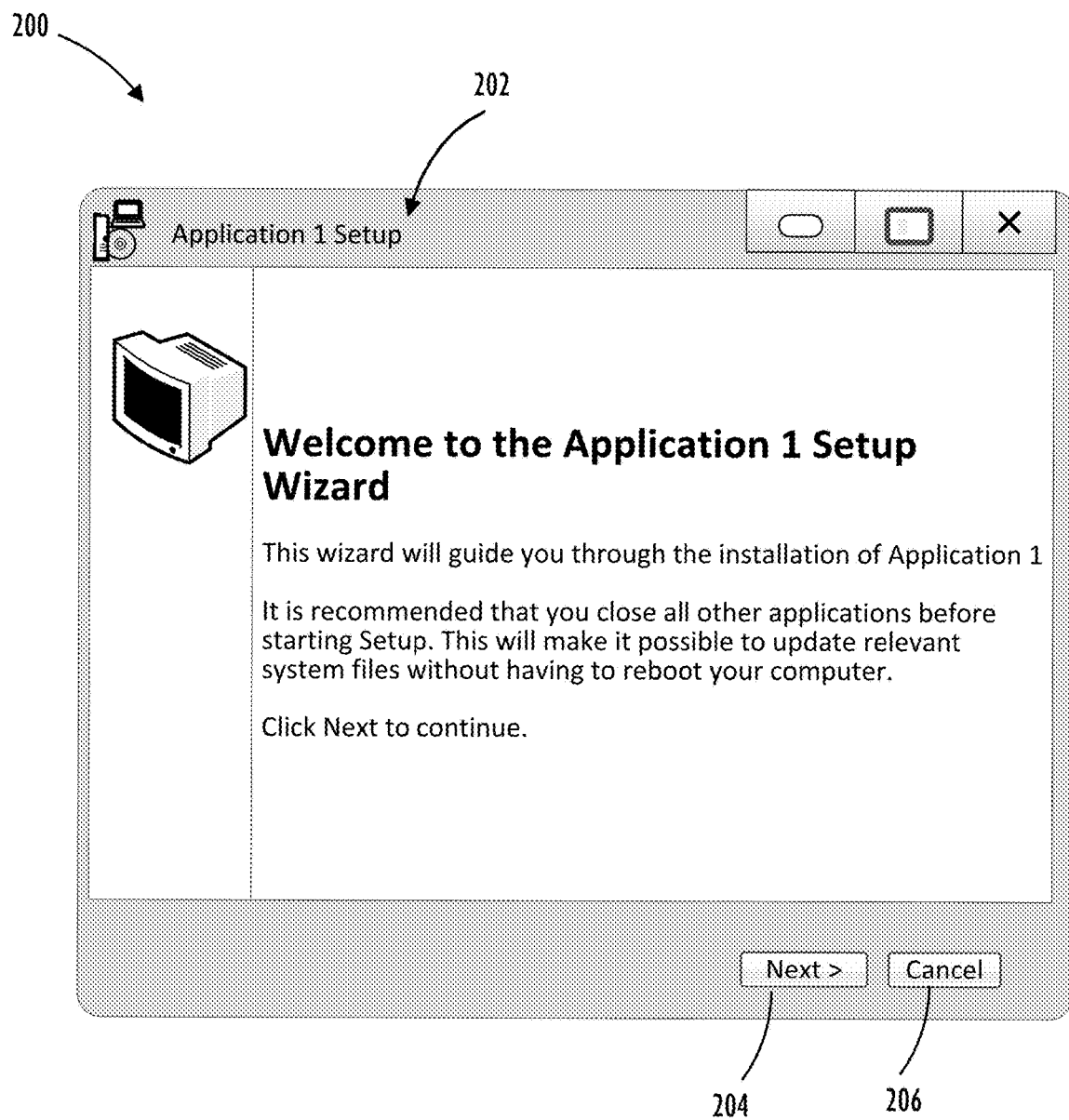
FIGS. 2A-B are examples of a graphical user interface that is created during installation of a software product according to one embodiment.
Figure 2B:
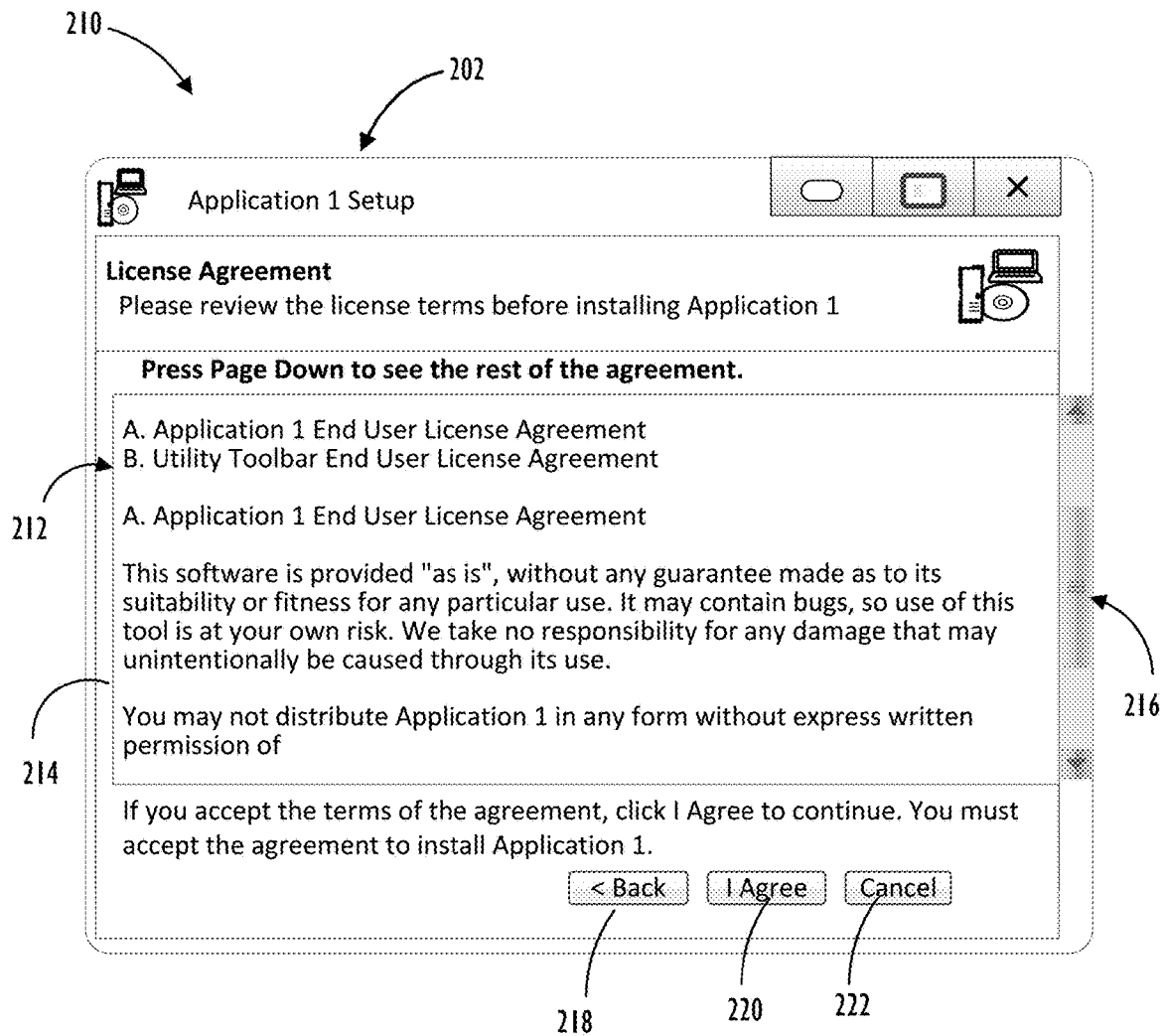

Malware software checker 108 may be configured with logic to extract information from GUI's launched during installation of user-intended software products or extracted from non-GUIs that may include information that may serve to identify user-intended software products or other bundled software. For example, textual information may be extracted from EULA text in a EULA GUI or from GUI objects such as check-boxes, non-textual information may be extracted from GUIs such as, for example, graphical objects such as icons, and information may be extracted from files that are not displayed on user client 106 such as, for example, textual or non-textual information in file names with executable files (for example, an installation package for user-intended software product can include a bundled software executable file as an ".exe") or textual information from text files that include identifiers of software products that are included in the installation of user-intended software products. Malware software checker 108 may also be configured to compare information in signature file 110 with information extracted from user-intended software products in order to determine the presence of additional bundled software in the user-intended software products that may potentially be installed during installation. In some embodiments, malware software checker 108 may be configured within an existing anti-virus software residing on user client 106 such as, for example, McAfee® anti-virus software by McAfee, Inc. or may be a standalone solution for detecting malware in user-intended software products. In one embodiment, with additional reference to FIGS. 2A-2B and 3, malware software checker 108 may be configured to identify software name from name 202 in GUI 200 or within EULA text 212 in GUI 210, respectively, and compare the software name to keywords in signature file 110 in order to determine the presence of bundled software in GUI 210 user-intended software products. In another embodiment, malware software checker 108 (FIG. 1) may also be configured to read text and keywords in boxes 302, 308 and check-box 306 in order to determine the presence of additional bundled software in GUI 300. use software information in signature file 110 and from information FIGS. 2A-2B depict examples of GUIs that may be created during installation of a user-intended software product on system 100 (FIG. 1) according to one embodiment. FIG. 2A depicts an example of an instance of an initial GUI 200 that may be launched or created on user client 106 (FIG. 1) during software installation of a user-intended software product according to one embodiment. In an embodiment, the user-intended software products may be installed using a software installer that is configured to perform software installation by creating GUIs, creating directories, registering shared libraries, updating system configuration settings, or the like. As shown, GUI 200 is initially launched or created when installation of the user-intended software product is initiated. GUI 200 may include software name 202 such as, for example, "Application 1", and GUI buttons 204 and 206 that a user may use to interact with the software during software installation. As shown in FIG. 2B, GUI 210 depicts an instance of a subsequent GUI that may be created during installation of a user-intended software product. GUI 210 may be created after the initial instance of GUI 200. GUI 210 may also include text in addition to GUI buttons during installation of the user-intended software product, for example, Application 1 on user client 106 (FIG. 1). Text can include text 212 for a EULA that is displayed in window 214 when GUI 210 is launched during installation. GUI 210 may also include scroll bar 216 and buttons 218, 220 and 222. Scroll bar 216 may be selectively movable, for example, movable upwards or downwards in FIG. 2B in order to access additional lines of text 212. Also, buttons 218-222 may be respectively selected by a user during the installation process of the user-intended software product in order to move backwards, forwards, or cancel the installation.

Figure 3:
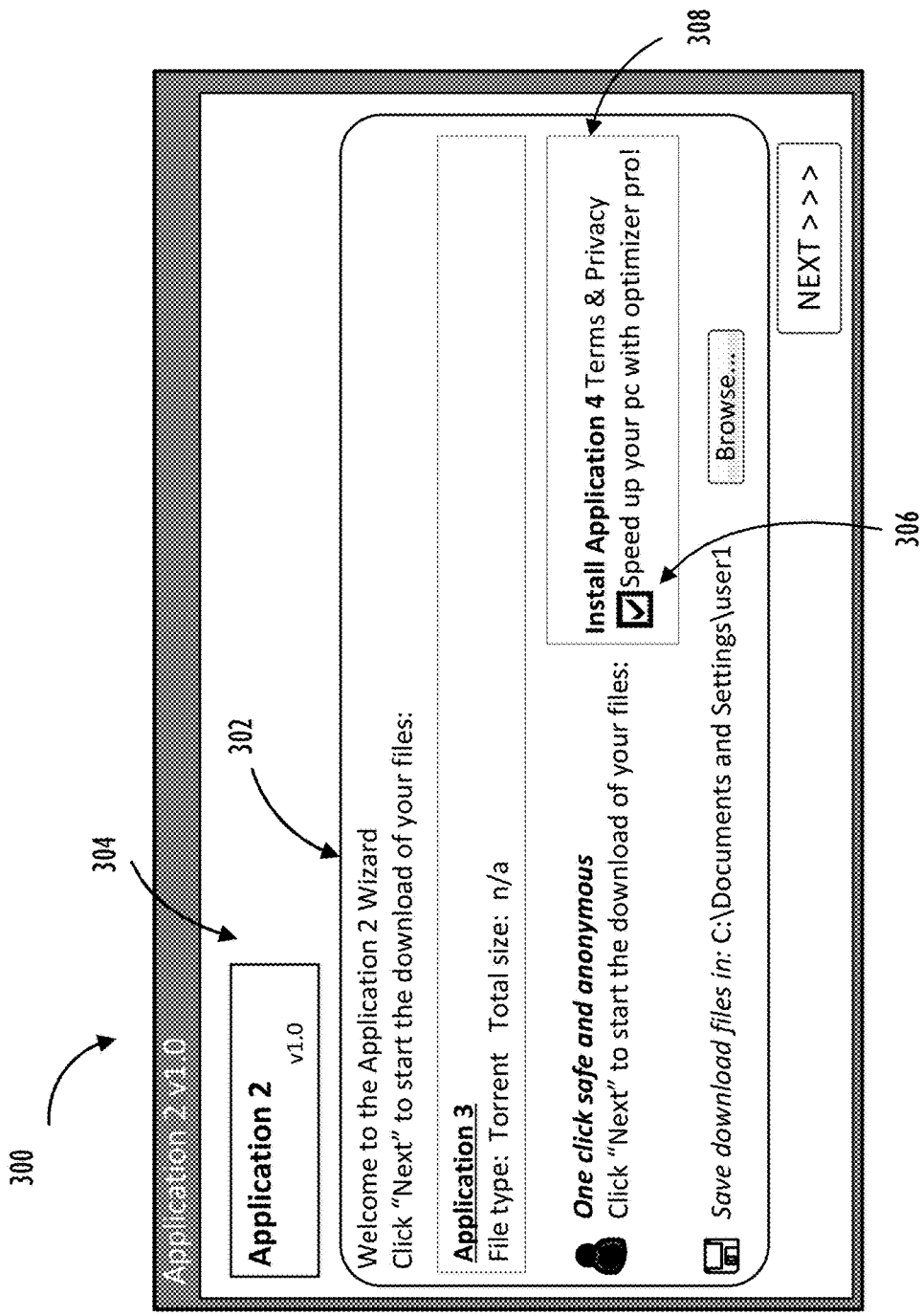
FIG. 3 is another example of a user interface that is created during installation of a software product according to one embodiment.

FIG. 3 is another example of an instance of a GUI 300 that is created on user client 106 (FIG. 1) during a software installation process according to one embodiment. As shown in FIG. 3, GUI 300 may include text box 302 that provides instructions during software installation of user-intended software 304, for example, instructions to install "Application 3" using the Application 2 installer. FIG. 3 also depicts a bundled software product that is bundled with Application 3. For example, an option box 306 (in this example, a check-box) in text box 308 indicates that another software application such as, for example, "Application 4" may be bundled with Application 3 within Application 2 and may be installed with Application 3. A user may manually and selectively uncheck or deselect option box 306 in order to prevent Optimizer Pro from being installed with Application 3 on user client 106.

Figure 4A:
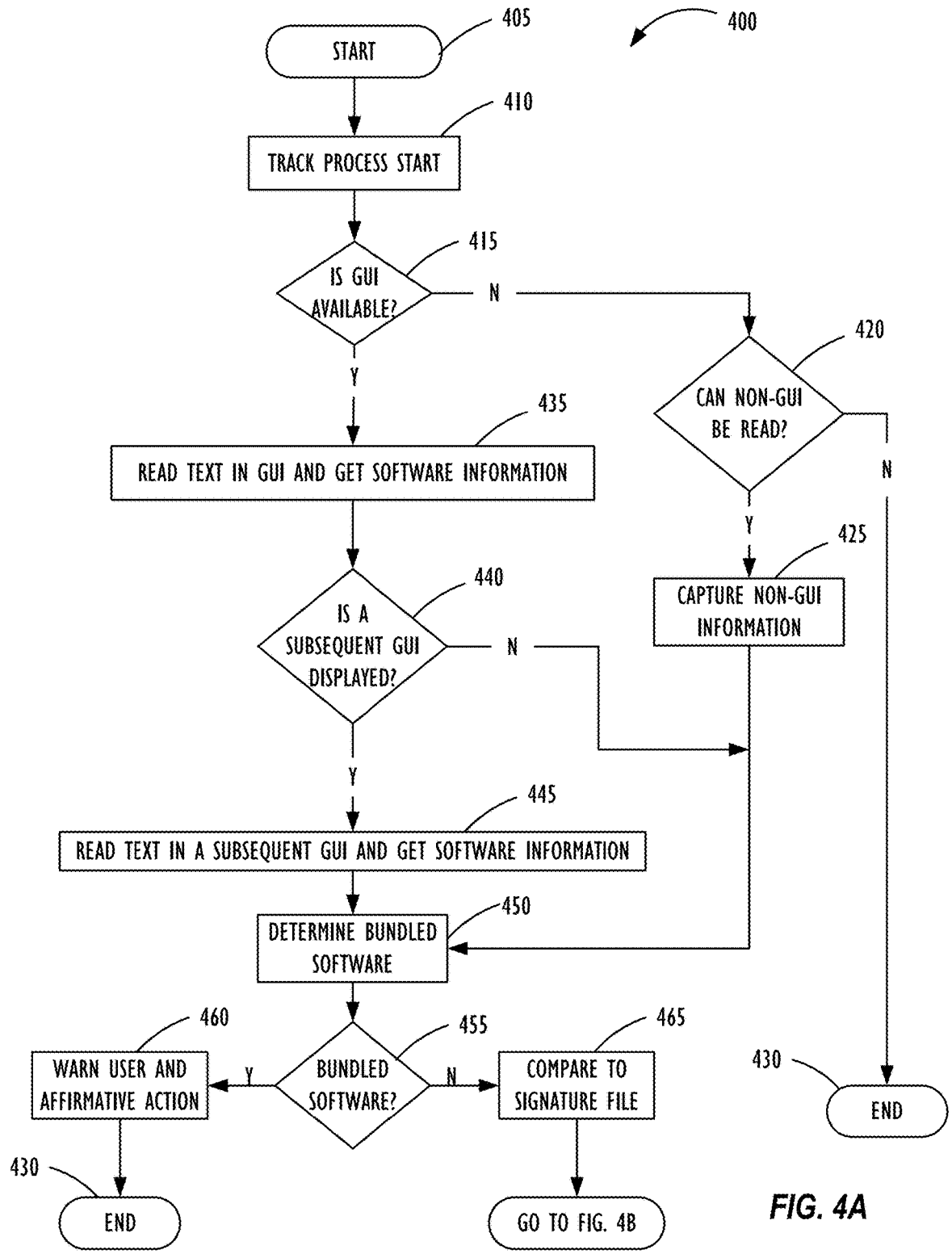
FIGS. 4A-4B are flowcharts illustrating a technique for detecting bundled software products during installation of a software product according to one embodiment.
Figure 4B:
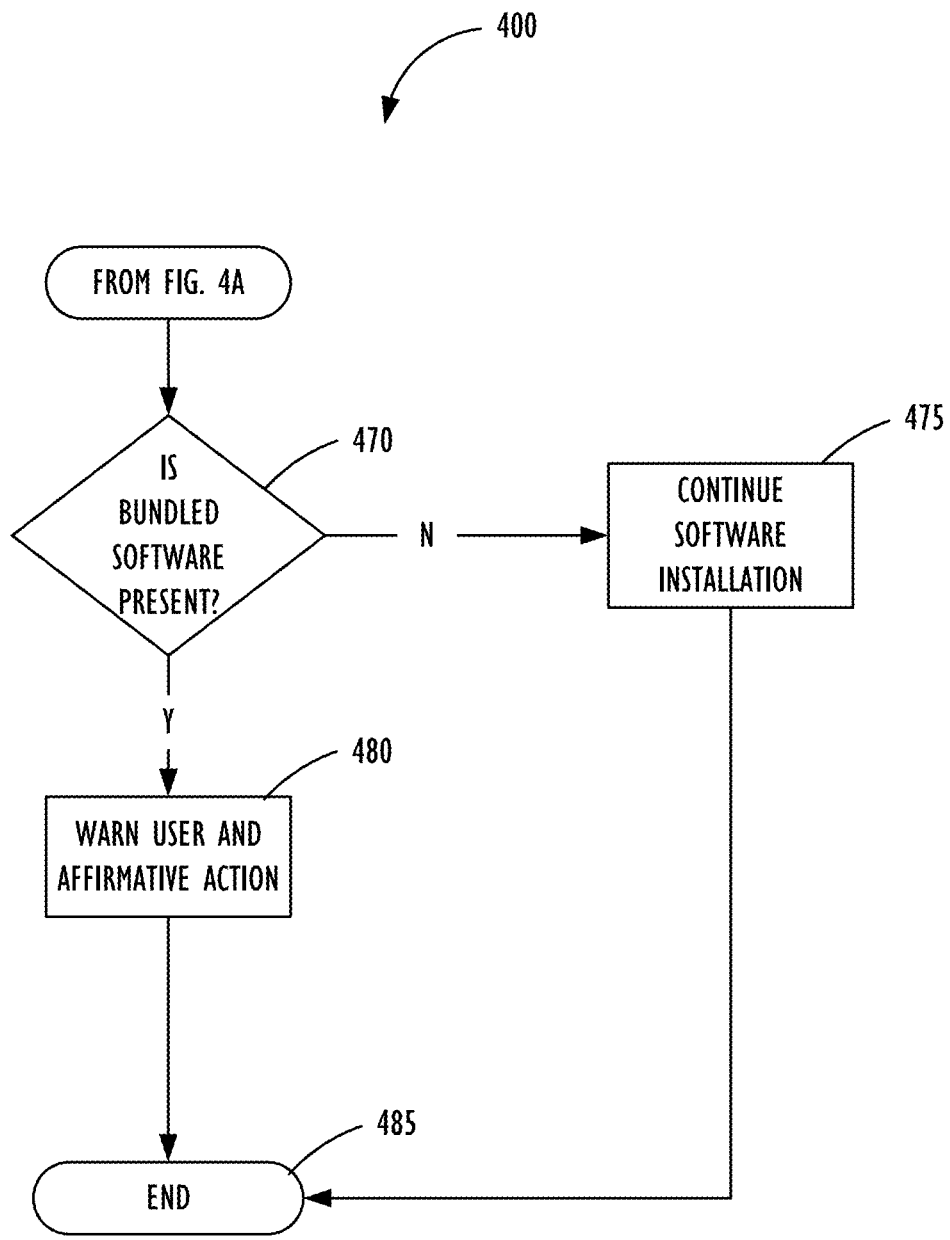

FIG. 4 is a flowchart illustrating an embodiment of method 400 that may be used for detecting the presence of bundled software during installation of a user-intended software product that is received from a server 102 (FIG. 1). The method 400 allows software users including novice software users to determine whether bundled components are included that may be unwanted although bundled as necessary components of the user-intended software. As method 400 is performed by system 100, FIG. 1 is also referenced in the description of method 400.

Method 400 begins in step 405 when installation of user-intended software product is initiated. The user-intended product may be received from server 102 in response to a request sent from user client 106 via network 104. In 410, an initial software process is tracked. For example, a user on user client 106 may initiate installation of the user-intended software product which instantiates a software process that is associated with an instance of the installation of the user-intended software product. This initial software process is tracked or monitored during installation of the user-intended software product. In an embodiment, installation of the user-intended software product may instantiate additional software processes that may be tracked during installation. In 415, system 100 determines if a GUI is displayed during software installation. The GUI may be an initial GUI instance, for example, GUI 200, that may be created on user client 106 during installation. If an initial GUI instance is not displayed or created (i.e., step 415="N"), step 415 proceeds to step 420 where it may be determined if software information including software identifiers may be captured from non-GUI files that are copied to memory on user client 106 during installation of the user-intended software product. Non-GUIs can include executable files, text files, or the like. If non-GUI's may not be able to be read (i.e., step 420="N"), in 430, the initial software process is "escaped" (or terminated) and installation is terminated or may be allowed to continue.

However, if software information may be captured from non-GUIs (i.e., step 420="Y"), in 425, software identifiers that identify the software the user intends to install as well as other bundled software products may be extracted from non-GUI files that are not displayed on user client 106. For example, software identifiers may be extracted from information within executable files (for example, a software installer executable file having an .exe extension) or may be extracted from information within text files (for example, files with a .txt extension). The extracted from non-GUIs are stored in memory. Step 425 proceeds to step 450.

However, in 415, if a GUI instance is displayed (i.e., step 415="Y"), then, in 435, the initial GUI instance is scanned/read and textual information within the GUI is identified and stored in memory on user client 106. For example, the GUI may be scanned to flag each indicator of a software identifier for a name of the software (e.g., software name 202 in FIG.

2A) of the user-intended software products that are being installed and continued scanning for each indicator of a software identifier for other bundled software that is included in the installation such as, in some non-limiting examples, textual information within a EULA that is displayed in the GUI, information extracted from GUI objects such as check-boxes and non-textual material and graphical objects such as icons. This scanned information is stored in memory.

In 440 if a subsequent GUI instance is displayed (i.e., step 440="Y"), in 445, information from the subsequent GUI instance may be scanned to identify software names of user-intended software products and other bundled software in the GUI. A subsequent GUI instance (for example, GUI 210 in FIG. 2B or GUI 300 in FIG. 3) may be created when a user selects a button to continue installation, for example, by selecting GUI button 204 in GUI 200 (FIG. 2A). The subsequent GUI instance may be read to identify software identifiers that can be used to determine user-intended software products and other additional bundled software such as, in some non-limiting examples, textual information within a EULA that is displayed in the GUI, information extracted from GUI objects such as check-boxes and non-textual material and graphical objects such as icons. In one embodiment, the GUI instance may be scanned in order to identify software names as well as identifying installation options provided in the GUI, for example, identifying installation options such as option box 306 in order to determine whether the installation options are components to be included in order to install user-intended software product or whether the installation options are options only associated with bundled PUPs. Software names, keywords and installation options in the subsequent GUI instance are stored in memory on user client 106. However, if a subsequent GUI instance is not displayed or created (i.e., step 440="N"), step 440 proceeds to step 450.

In 450, malware software checker 108 uses software identifiers that were flagged during scanning of user-intended software products to determine if bundled software products are included. User client 106 may compare the extracted software information such as, for example, compare the extracted software identifiers with information on software names in order to identify the user-intended software products and whether additional PUPs or components may be bundled that are unwanted for installation of the user-intended software products.

In 455, malware software checker 108 determines whether additional bundled software products are included in the user-intended software products based on the comparison in step 450 (i.e., step 455="Y"), in 460, a visual alert may be displayed on a display of user client 106 that provides a warning to a user and installation of the user-intended software product may be blocked by terminating the initial software process or a user may proceed to install the user-intended software products upon affirmative action (i.e., user affirmatively selects installation) by the user. Method 400 ends in step 430 when analysis of the user-intended software product is completed or installation is completed.

However, if malware software checker cannot determine that bundled software products are included (i.e., step 455="N"), in 465, extracted information including software identifiers is compared with information in signature file 110 and with blacklisted and whitelisted information in order to identify the user-intended software products as well as other bundled software as part of the installation of the user-intended software products. User client 106 may receive an updated signature file 110 in response to a request that is sent from user client 106 during installation of the user-intended software products or signature file 110 may receive an updated signature file 110 periodically from third-party server 112.

In one embodiment, comparison with the signature file 110 is performed at user client 106, which receives signature file 110 from third-party server 112. User client 106 may compare the extracted software information with signature file 110 such as, for example, compare the extracted software identifiers with information on software names with their associated bundled components in signature file 110 in order to identify the user-intended software products and whether additional PUPs or components may be bundled that are unwanted for installation of the user-intended software products. In other embodiments, user client 106 may compare the extracted software information with blacklisted software names or blacklisted sites and domains in signature file 110 *i* for identifying undesirable applications that are known to contain threats or vulnerabilities and to compare the extracted software information with whitelisted software names and whitelisted sites and domains in order to identify known good applications that may be permitted to execute.

Alternatively, comparison with the signature file 110 may be performed at third-party server 112, which receives extracted software information from user client 106. Third-party server 112 may use signature file 110 to compare the extracted software identifiers with signature file 110 in order to identify the user-intended software products and whether additional PUPs or components are bundled that are unwanted for installation of the user-intended software products. In other embodiments, third-party server 112 may compare the extracted software information with blacklisted software and blacklisted sites and domains in signature file 110 in order to identify undesirable applications that are known to contain threats or vulnerabilities and to compare the extracted software information with whitelisted software and whitelisted sites and domains in order to identify known good applications that may be permitted to execute.

In 470, if additional bundled software is included in the user-intended software product that are unwanted based on the comparison with signature file 110 in step 465 (i.e., step 470="Y"), in 480, a visual alert may be displayed on a display of user client 106 that provides a warning to a user and installation of the user-intended software product may be blocked by terminating the initial software process. The visual alert may be provided based on analysis performed by user client 106 during installation of the user-intended software products or may be provided based on analysis performed by third-party server 112 that returns the analysis to user client 106. In an embodiment, a visual alert may be presented via an anti-virus software on user client 106 by notifying the user that the user-intended software product includes bundled PUPs and that installation is being terminated. A user may also be presented with an option to deselect one or more installation options for the bundled PUPs by displaying a GUI instance with installation options that a user can select or deselect. However, a user may choose to continue the initial software process and continue installation of the user-intended software product and the bundled PUPs without deselecting any installation options. Alternately, embodiments may default to not installing the bundled PUPs without affirmative action selecting the PUPs. However, in 470, if bundled software is not present based on the comparison with signature file 110 in step 465 (i.e., step 470="N"), in 475, the software installation process of user-intended software product is allowed to proceed until completion. Method 400 ends in step 485 when analysis of the user-intended software product is completed or installation is completed.

Figure 5:
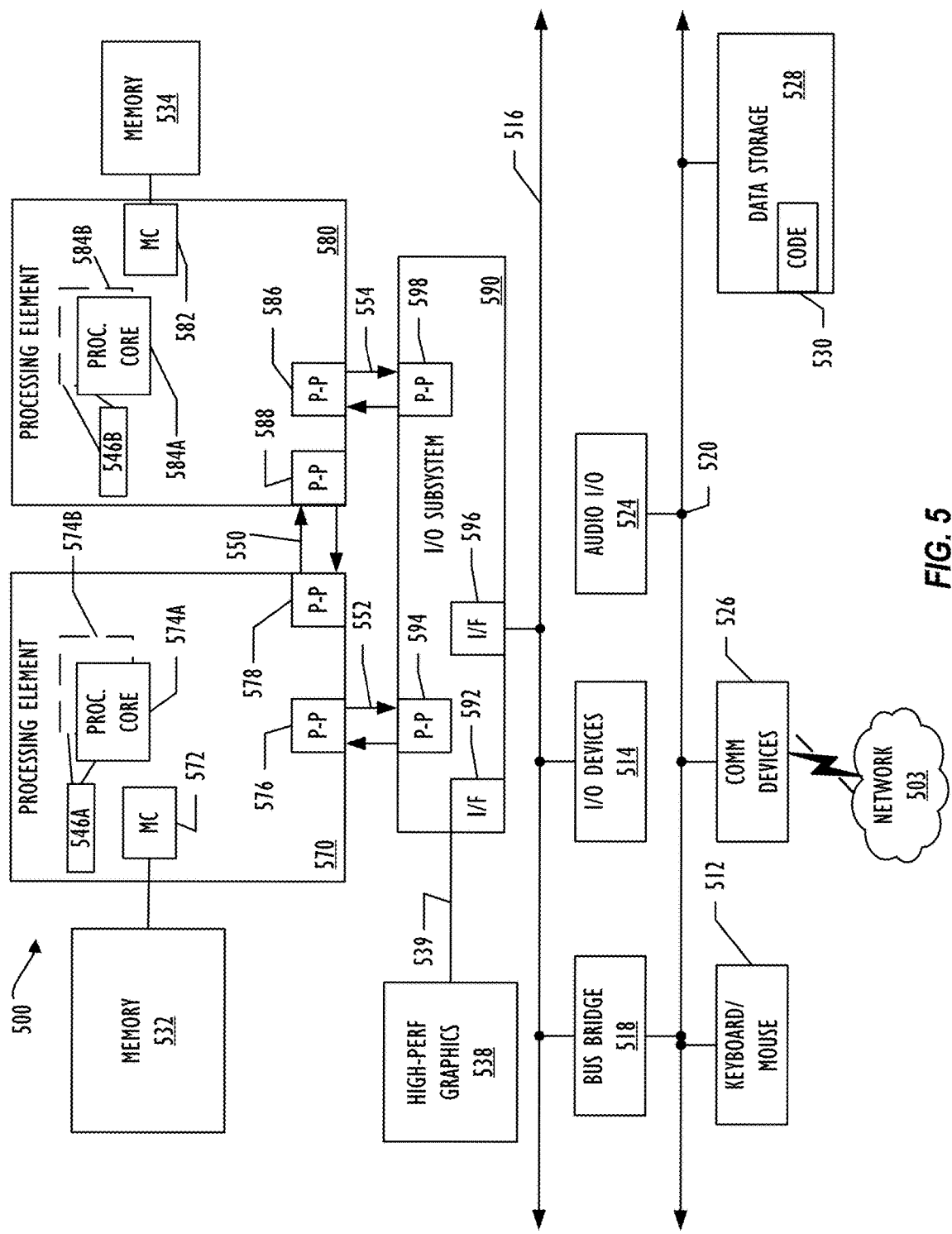
FIG. 5 is a block diagram illustrating a computing device for use with techniques described herein according to one embodiment.

Referring now to FIG. 5, a block diagram illustrates a programmable device 500 that may be used within user client 106 in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multidrop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-4. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors.

While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 which may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second bus 520.

Note that other embodiments are contemplated. For example, instead of the point-to-point architecture of FIG. 5, a system may implement a multi-drop bus or another such communication topology. Although links 516 and 520 are illustrated as busses in FIG. 4, any desired type of link may be used. Also, the elements of FIG. 5 may alternatively be partitioned using more or fewer integrated chips than illustrated in FIG. 5.

Figure 6:
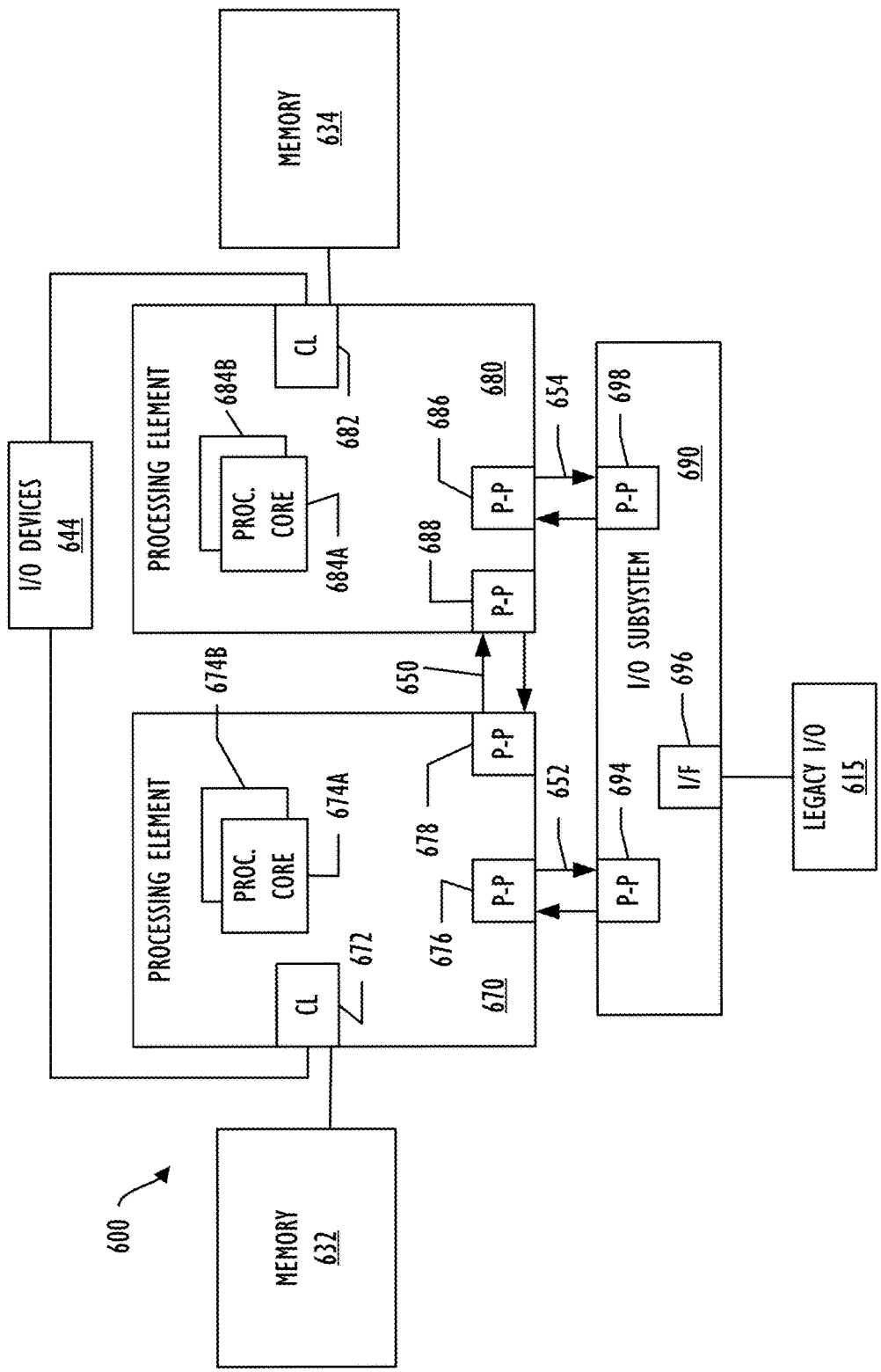
FIG. 6 is a block diagram illustrating a computing device for use with techniques described herein according to another embodiment.

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the 672, 682, but also that I/O devices 644 may be coupled to the control logic 672, 682. Legacy I/O devices 615 may be coupled to the I/O subsystem 690 by interface 696. Each processing element 670, 680 may include multiple processor cores, illustrated in FIG. 5 as processor cores 674A, 674B, 684A, and 684B. As illustrated in FIG. 6, I/O subsystem 690 includes P-P interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

Figure 7:
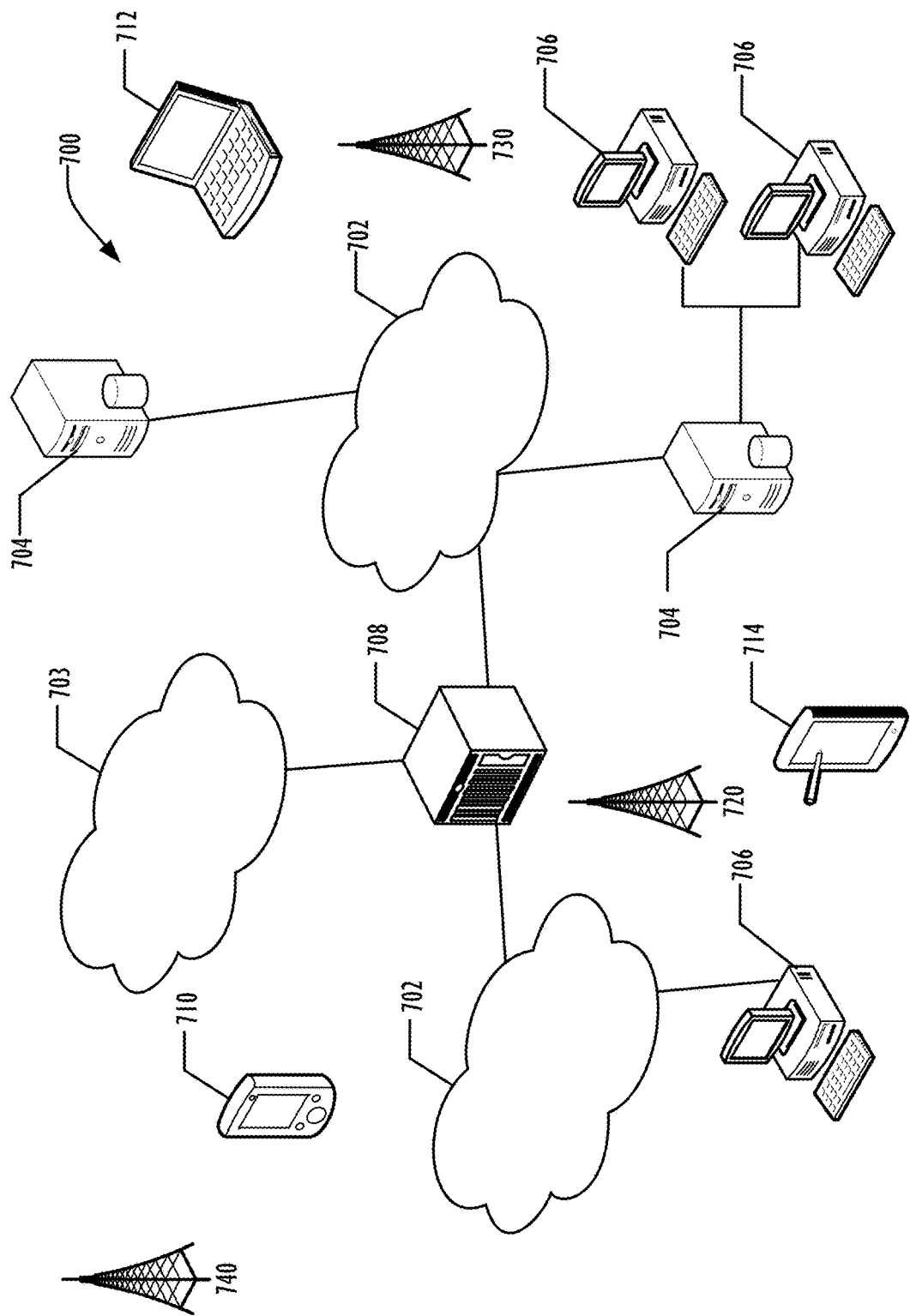
FIG. 7 is a block diagram illustrating a network of programmable devices according to one embodiment.

Referring now to FIG. 7, an example infrastructure 700 in which the techniques described above may be implemented is illustrated schematically. Infrastructure 700 contains computer networks 702. Computer networks 702 may include many different types of computer networks available today, such as the Internet, a corporate network, or a Local Area Network (LAN). Each of these networks can contain wired or wireless programmable devices and operate using any number of network protocols (e.g., TCP/IP). Networks 702 may be connected to gateways and routers (represented by 708), end user computers 706, and computer servers 704. Infrastructure 700 also includes cellular network 703 for use with mobile communication devices. Mobile cellular networks support mobile phones and many other types of mobile devices. Mobile devices in the infrastructure 700 are illustrated as mobile phones 710, laptops 712, and tablets 714. A mobile device such as mobile phone 710 may interact with one or more mobile provider networks as the mobile device moves, typically interacting with a plurality of mobile network towers 720, 730, and 740 for connecting to the cellular network 703. Although referred to as a cellular network in FIG. 7, a mobile device may interact with towers of more than one provider network, as well as with multiple non-cellular devices such as wireless access points and routers 708. In addition, the mobile devices 710, 712, and 714 may interact with non-mobile devices such as computers 704 and 706 for desired services, which may include checking for the presence of bundled software in an application as described above. The functionality of user client 106 may be implemented in any device or combination of devices illustrated in FIG. 7; however, most commonly is implemented in a firewall or intrusion protection system in a gateway or router.

The following examples pertain to further embodiments.

Example 1 is a machine readable medium, on which are stored instructions, comprising instructions that when executed by a processor cause a machine to: identify an instance of a software process associated with installation of a software product; scan the software product for identifying first information in the software product; continue scanning the software product for identifying second information in the software product; compare the first information with second information responsive to scanning the software product; and determine whether one or more additional software products are to be installed with the software product responsive to comparing the first information and the second information.

In Example 2, the subject matter of Example 1 can optionally include, wherein the instructions further comprise instructions that when executed cause the machine to display an alert on an user interface responsive to determining that the software product includes the one or more additional software products.

In Example 3, the subject matter of Example 1 to 2 can optionally include, wherein the instructions to display the alert further comprise instructions that when executed cause the machine to terminate the instance of the software process responsive to determining that the software product includes the one or more additional software products.

In Example 4, the subject matter of Example 1 to 2 can optionally include, wherein the instructions to identify the first information further comprise instructions that when executed cause the machine to read textual information in at least one graphical user interface (GUI) of the software product.

In Example 5, the subject matter of Example 1 to 2 can optionally include, wherein the instructions to identify the first information further comprise instructions that when executed cause the machine to read textual information from one or more files that are associated with the software product.

In Example 6, the subject matter of Example 1 to 2 can optionally include, wherein the instructions further comprise instructions that when executed cause the machine to receive a signature file from a server.

In Example 7, the subject matter of Example 6 can optionally include, wherein the instructions further comprise instructions that when executed cause the machine to compare the first and the second information to the signature file responsive to receiving the signature file from the server.

In Example 8, the subject matter of Example 1 to 2 can optionally include, wherein the first information comprises a name of the software product.

In Example 9, the subject matter of Example 1 to 2 can optionally include, wherein the second information comprises a name for the one or more additional software products.

Example 10 is a computer system for detecting bundled software during installation of a software product, comprising: one or more processors; and a memory coupled to the one or more processors, on which are stored instructions, comprising instructions that when executed cause one or more of the processors to: identify an instance of a software process associated with installation of a software product; scan the software product for identifying first information in the software product; continue scanning the software product for identifying second information in the software product; compare the first information and the second information with information in a signature file; and determine whether one or more additional software products are to be installed with the software product responsive to comparing the first information and the second information.

In Example 11, the subject matter of Example 10 can optionally include, wherein the instructions further comprise instructions that when executed cause the one or more of the processors to terminate the instance of the software process responsive to determining that the one or more additional software products are not to be installed with the software product.

In Example 12, the subject matter of Example 10 to 11 can optionally include, wherein the instructions further comprise instructions that when executed cause the one or more of the processors to display an alert on an user interface responsive to determining that the software product includes the one or more additional software products.

In Example 13, the subject matter of Example 10 to 11 can optionally include, wherein the instructions further comprise instructions that when executed cause the one or more of the processors to read textual information in at least one graphical user interface (GUI) of the software product.

In Example 14, the subject matter of Example 10 to 11 can optionally include, wherein the instructions further comprise instructions that when executed cause the one or more of the processors to read textual information from one or more files that are associated with the software product.

In Example 15, the subject matter of Example 10 to 11 can optionally include, wherein the instructions further comprise instructions that when executed cause the one or more of the processors to receive the signature file from a server.

In Example 16, the subject matter of Example 10 to 11 can optionally include, wherein the first information comprises a name of the software product.

In Example 17, the subject matter of Example 10 to 11 can optionally include, wherein the second information comprises a name for each of the one or more additional software products.

In Example 18, the subject matter of Example 10 to 11 can optionally include, wherein the instructions further comprise instructions that when executed cause the one or more of the processors to transmit the first information to a server.

In Example 19, the subject matter of Example 18 can optionally include, wherein the instructions further comprise instructions that when executed cause the one or more of the processors to receive information related to determining that the one or more additional software products are not to be installed with the software product responsive to transmitting the first information to the server.

Example 20 is a method for detecting bundled software during installation of a software product, comprising: receiving first information related to software names and associated bundled components; receiving second information related to at least one of blacklisted and whitelisted information; generating a signature file from at least one of the first and the second information; receiving a request for the signature file from a user client; and transmitting the signature file to the user client responsive to receiving the request for the signature file.

In Example 21, the subject matter of Example 20 can optionally include, further comprising receiving software information associated with the software product from the user client.

In Example 22, the subject matter of Example 21 can optionally include, further comprising: comparing the software information with information in the signature file; and determining whether at least one additional software product is to be installed with the software product responsive to comparing the software information and the signature file.

In Example 23, the subject matter of Example 22 can optionally include, further comprising transmitting instructions for terminating the installation of the software product responsive to determining that the software product includes the one or more additional software products.

In Example 24, the subject matter of Example 20 to 23 can optionally include, further comprising receiving textual information in at least one graphical user interface (GUI) of the software product from the user client, wherein the textual information comprises a name of the software product.

In Example 25, the subject matter of Example 20 to 23 can optionally include, further comprising receiving textual information from one or more files that are associated with the software product.

Example 26 is a computer system for detecting bundled software during installation of a software product, comprising: one or more processors; and a memory coupled to the one or more processors, on which are stored instructions, comprising instructions that when executed cause one or more of the processors to: identify an instance of a software process associated with installation of a software product; scan the software product for identifying first information in the software product; continue scanning the software product for identifying second information in the software product; compare the first information and the second information with information in a signature file; and determine whether one or more additional software products are to be installed with the software product responsive to comparing the first information and the second information.

In Example 27, the subject matter of Example 26 can optionally include, wherein the instructions further comprise instructions that when executed cause the one or more of the processors to terminate the instance of the software process responsive to determining that the one or more additional software products are not to be installed with the software product.

In Example 28, the subject matter of Example 26 to 27 can optionally include, wherein the instructions further comprise instructions that when executed cause the one or more of the processors to display an alert on an user interface responsive to determining that the software product includes the one or more additional software products.

In Example 29, the subject matter of Example 26 to 27 can optionally include, wherein the instructions further comprise instructions that when executed cause the one or more of the processors to read textual information in at least one graphical user interface (GUI) of the software product.

In Example 30, the subject matter of Example 26 to 27 can optionally include, wherein the instructions further comprise instructions that when executed cause the one or more of the processors to read textual information from one or more files that are associated with the software product.

In Example 31, the subject matter of Example 26 to 27 can optionally include, wherein the instructions further comprise instructions that when executed cause the one or more of the processors to receive the signature file from a server.

In Example 32, the subject matter of Example 26 to 27 can optionally include, wherein the first information comprises a name of the software product.

In Example 33, the subject matter of Example 26 to 27 can optionally include, wherein the second information comprises a name for each of the one or more additional software products.

In Example 34, the subject matter of Example 26 to 27 can optionally include, wherein the instructions further comprise instructions that when executed cause the one or more of the processors to transmit the first information to a server.

In Example 35, the subject matter of Example 34 can optionally include, wherein the instructions further comprise instructions that when executed cause the one or more of the processors to receive information related to determining that the one or more additional software products are not to be installed with the software product responsive to transmitting the first information to the server.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one storage device that is not a propagating signal, the at least one storage device comprising instructions that, when executed by at least one processor, cause the at least one processor to at least:
   identify initiation of a process for installing a software product;
   scan the software product, after identifying the initiation of the process and prior to completing the installation of the software product, to identify first information, the first information from a file associated with the software product, the first information indicative of a main application to be installed as part of the software product;

scan information displayed to a user during the installation of the software product to identify second information;

identify whether a bundled application is included in the software product based on the first information, the second information, and a signature file, wherein the signature file includes information indicative of applications that are identified as malware software applications;

install the main application responsive to a determination that the bundled application is not included in the software product; and halt installation of the main application and the bundled application, responsive to a determination that the bundled application is included in the software product.

2. The at least one storage device of claim 1, wherein the instructions, when executed, cause the at least one processor to initiate an alert on a user interface responsive to identifying that the software product includes the bundled application.

3. The at least one storage device of claim 1, wherein the first information includes text to be displayed to the user.

4. The at least one storage device of claim 1, wherein the first information includes information from a graphical user interface (GUI), and the instructions, when executed, cause the at least one processor to identify the first information based on text within a license agreement displayed in the GUI.

5. The at least one storage device of claim 1, wherein the first information includes information from a graphical user interface (GUI), and the instructions, when executed, cause the at least one processor to identify the first information by extracting GUI objects and non-textual material from the GUI.

6. The at least one storage device of claim 1, wherein the instructions, when executed, cause the at least one processor to access the signature file from a server.

7. The at least one storage device of claim 1, wherein the first information includes a software identifier for the main application.

8. The at least one storage device of claim 1, wherein the second information includes a name for the bundled application.

9. A computer system comprising:
one or more processors; and
memory including instructions which, when executed, cause at least one of the one or more processors to:
identify execution of a process that installs a software product;
scan the software product, prior to completing the execution of the process, to identify first information, the first information extracted from a file associated with the software product, the first information indicative of a main application to be installed as part of the software product;
scan second information displayed to a user during installation of the software product;
identify whether a bundled application is included within the software product based on the first information, the second information, and a signature file, wherein the signature file includes information indicative of applications that are identified as malware software applications;
install the main application responsive to a determination that the bundled application is not included in the software product; and
halt installation of the main application and the bundled application, in response to a determination that the bundled application is included in the software product.

10. The computer system of claim 9, wherein at least one of the first or the second information includes text.

11. The computer system of claim 9, wherein at least one of the one or more processors is to initiate display of an alert to identify that the software product includes the bundled application.

12. The computer system of claim 9, wherein the first information includes information from a graphical user interface (GUI), and at least one of the one or more processors is to access text within a license agreement.

13. The computer system of claim 9, wherein the first information includes information from a graphical user interface (GUI) instance, and at least one of the one or more processors is to extract GUI objects and non-textual material from the GUI.

14. The computer system of claim 9, wherein at least one of the one or more processors is to request the signature file from a server.

15. The computer system of claim 9, wherein the first information includes a software identifier for the main application.

16. The computer system of claim 9, wherein the second information includes a name for the bundled application.

17. The computer system of claim 9, wherein at least one of the one or more processors is to transmit at least one of the first information or the second information to a server.

18. The computer system of claim 17, wherein at least one of the one or more processors is to at least receive information related to identifying that the bundled application is not to be installed with the software product responsive to transmitting the first information to the server.

19. A method comprising:
identifying, at a client device, execution of a process to install a software product;
scanning, prior to completing the installation of the software product on the client device, the software product to identify first information, the first information to include information extracted from a file associated with the software product that is indicative of a main application to be installed as part of the software product;
scanning, at the client device, second information displayed to a user during the installation of the software product;
identifying whether a bundled application is included in the software product based on the first information, the second information, and a signature file, wherein the signature file includes information indicative of applications that are identified as malware software applications;
installing the main application in response to a determination that the bundled application is not included in the software product; and
halting installation of the main application and the bundled application, in response to a determination that the bundled application is included in the software product.

20. The method of claim 19, wherein the signature file includes blacklisted and whitelisted information.

21. The method of claim 19, wherein at least one of the first or the second information includes text.

22. The method of claim 19, further including initiating display of an alert to identify that the software product includes the bundled application.

23. The method of claim 19, wherein the first information includes information from a graphical user interface (GUI), and the method further includes accessing text within a license agreement.

24. The method of claim 19, wherein the first information includes information from a graphical user interface (GUI) instance, and the method further includes extracting GUI objects and non-textual material from the GUI.

25. The method of claim 19, further including requesting the signature file from a server.

26. The method of claim 19, wherein the first information includes a software identifier for the main application.

27. The method of claim 19, wherein the second information includes a name for the bundled application.

28. The method of claim 19, further including transmitting at least one of the first information or the second information to a server.

29. The method of claim 28, further including accessing information related to identifying that the bundled application is not to be installed with the software product responsive to transmitting the first information to the server.

* * * * *